(12) United States Patent
Klein

(10) Patent No.: US 8,508,208 B2
(45) Date of Patent: Aug. 13, 2013

(54) BUCK-BOOST REGULATOR WITH CONVERTER BYPASS FUNCTION

(75) Inventor: Jonathan Klein, Palo Alto, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 430 days.

(21) Appl. No.: 12/830,074

(22) Filed: Jul. 2, 2010

(65) Prior Publication Data

US 2012/0001610 A1  Jan. 5, 2012

(51) Int. Cl.
*G05F 1/00* (2006.01)

(52) U.S. Cl.
USPC ............................ 323/284; 323/282; 323/285

(58) Field of Classification Search
USPC ........................................ 323/282, 284, 285
See application file for complete search history.

(56) References Cited

U.S. PATENT DOCUMENTS

| | | | |
|---|---|---|---|
| 5,949,224 A * | 9/1999 | Barkaro ........................ | 323/282 |
| 6,166,527 A | 12/2000 | Dwelley et al. | |
| 6,275,016 B1 | 8/2001 | Ivanov | |
| 8,324,921 B2 * | 12/2012 | Adest et al. ............... | 324/761.01 |
| 2005/0110471 A1 * | 5/2005 | Mayega et al. ................ | 323/267 |
| 2006/0006850 A1 * | 1/2006 | Inoue et al. .................... | 323/265 |
| 2006/0055384 A1 * | 3/2006 | Jordan et al. .................. | 323/282 |
| 2008/0055946 A1 * | 3/2008 | Lesso et al. ...................... | 363/63 |
| 2008/0100274 A1 * | 5/2008 | Hayakawa ...................... | 323/284 |
| 2008/0136387 A1 * | 6/2008 | Bertele .......................... | 323/282 |
| 2010/0148740 A1 | 6/2010 | Saitoh | |
| 2010/0157635 A1 * | 6/2010 | Bagarelli et al. ............... | 363/123 |
| 2011/0169466 A1 * | 7/2011 | Kuan et al. ..................... | 323/282 |
| 2011/0187336 A1 * | 8/2011 | Wu et al. ........................ | 323/282 |
| 2011/0285375 A1 * | 11/2011 | Deboy ........................... | 323/299 |

FOREIGN PATENT DOCUMENTS

| | | |
|---|---|---|
| CN | 102315774 A | 1/2012 |
| KR | 20120003398 A | 1/2012 |

* cited by examiner

*Primary Examiner* — Adolf Berhane
*Assistant Examiner* — Gary Nash
(74) *Attorney, Agent, or Firm* — Schwegman Lundberg & Woessner P.A.

(57) ABSTRACT

This document provides methods and apparatus configured to efficiently regulate an output voltage near a desired voltage level, for example, under varying input or load conditions. An example apparatus can include a regulator having a boost controller configured to provide voltage to an output of the regulator when at least one of the output voltage or the input voltage is below a first threshold voltage and a buck controller configured to provide voltage to the output of the regulator when at least one of the output voltage or the input voltage is above a second threshold voltage. Further, the regulator can be configured to provide the input voltage at the output of the regulator when at least one of the input voltage or the output voltage is between the first and second threshold voltages. In some examples, the first threshold is below the second threshold.

23 Claims, 3 Drawing Sheets

BUCK-BOOST REGULATOR WITH CONVERTER BYPASS FUNCTION

BACKGROUND

Generally, voltage provided by a battery declines as charge is depleted. Load conditions can also cause battery voltage to vary. Many components in electronic devices require a stable voltage source, creating the need for voltage regulation between a battery and its load. If the voltage required by a system component is between the fully charged and discharged voltage of the battery, a voltage regulator can be used to buck (decrease) or boost (increase) the battery voltage over the range of output load conditions.

OVERVIEW

This document provides methods and apparatus configured to efficiently regulate an output voltage near a desired voltage level, for example, under varying input or load conditions. An example apparatus can include a regulator having a boost controller configured to provide voltage to an output of the regulator when at least one of the output voltage or the input voltage is below a first threshold voltage and a buck controller configured to provide voltage to the output of the regulator when at least one of the output voltage or the input voltage is above a second threshold voltage. Further, the regulator can be configured to provide the input voltage at the output of the regulator when at least one of the input voltage or the output voltage is between the first and second threshold voltages. In some examples, the first threshold is below the second threshold.

In an example, an apparatus can include a buck regulator and a boost regulator that share a common inductor. A regulation reference of the buck regulator can be set higher than a regulation reference of the boost regulator. In a method example, when the combination of input voltage and load current cause the output voltage to decrease too low for the buck controller to maintain regulation at the buck regulation reference, the duty cycle of the buck control can be 100%. As the output voltage decreases, for example, due to further decreases in the input voltage and/or output load, the output voltage crosses the boost regulation reference, causing the boost regulator to begin to regulate. The boost regulator can increase the output voltage and prevent the output voltage from decreasing below the boost regulation reference.

This section is intended to provide an overview of subject matter of the present patent application. It is not intended to provide an exclusive or exhaustive explanation of the invention. The detailed description is included to provide further information about the present patent application.

DETAILED DESCRIPTION

Figure 1:
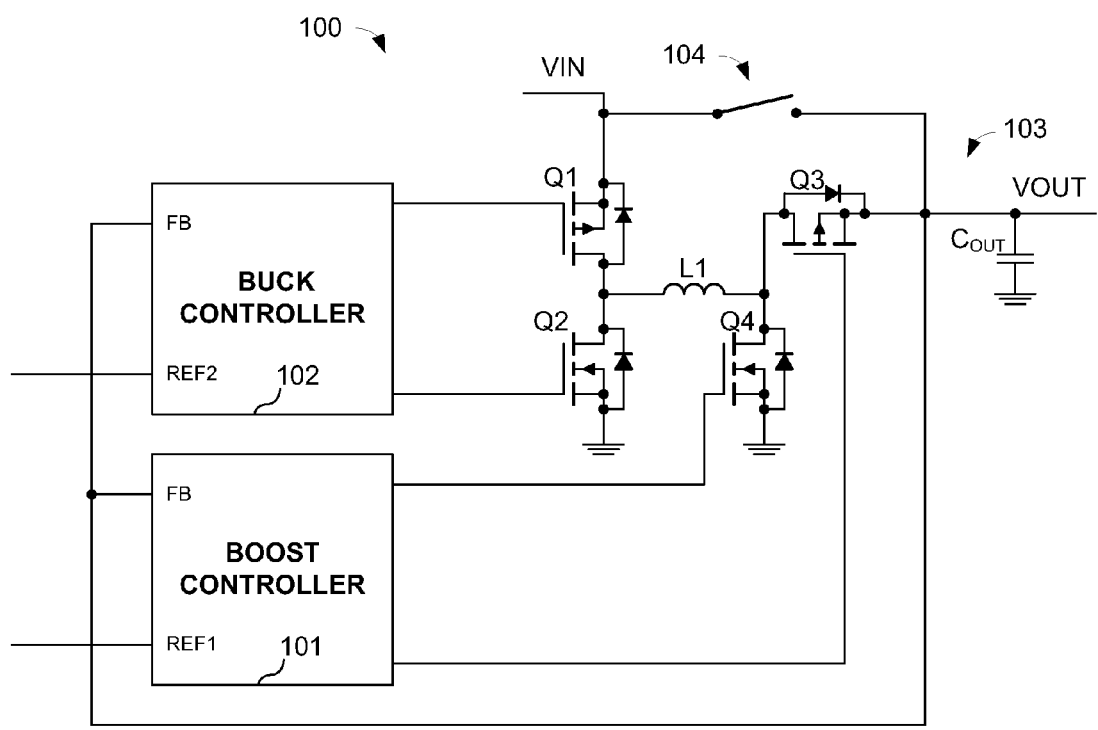
FIG. 1 shows an apparatus according to one embodiment of the present subject matter.

Many consumer electronic devices include power supplies that allow the devices to be operated without receiving energy from a source external to the device. Such power supplies include batteries and capacitors. In various devices, the power supplies are designed to last throughout the life cycle of the device. In some devices, the power supplies are rechargeable. The power supplies may or may not have an operating window wherein the power supply provides a steady state voltage capable of operating all the electronics of the device. In some devices, a regulator is provided to assist in supplying a desired voltage conducive to the operation of one or more subcomponents of the device using the energy from the power supply. In various devices, the regulator can provide the desired voltage even though the voltage from the power supply is not at or within the desired voltage range for operation of the device, such as by raising, or boosting, voltage from an input power supply, or by reducing, or bucking, voltage from the input power supply to provide the desired output voltage to operate the device or a sub component of the device.

For example, a power source can have a varying voltage profile as a device uses the energy stored in the power source. Batteries have a voltage profile that declines as the energy stored in the battery is used, and that increases as the energy stored in the battery is recharged. A new battery can therefore supply an initial voltage that may be higher than required to operate a device. As the energy is used, the battery voltage can decline such that it is lower than that required to operate the device. A buck/boost regulator can provide the desired voltage to operate a device using the energy of a power source (e.g., a battery) even though the voltage supplied by the power source can vary. In addition to providing a constant operating voltage, the regulator can allow the energy of the battery to be used more completely, even as the battery approaches the end of its useful life or useful charge cycle. It is understood that power supplies having other voltage profiles may be used with a voltage regulator according to the present subject matter and that the teachings herein are not limited to power supply voltage profiles that decline as the stored energy of the power supply is used.

In other examples, device operating conditions can also cause the voltage of a battery or charged power source to vary. For example, it is common for the voltage of a battery to drop as more current is supplied. In a wireless communication device, for example, current draw can vary greatly when the transmitter of the device is pulsed (e.g., when the device is searching for a signal). In other examples, the current can vary with respect to transmitter frequency. As the current demanded from a power supply varies, the voltage can also vary, thus requiring regulation to maintain a desired operating voltage of the device or subcomponents of the device, including, but not limited to, one or more of a processor, a functional module, a display, memory, or one or more other device subcomponent.

In an example, a buck-boost regulator can regulate operating voltages of devices powered by a varying power source. In certain examples, buck-boost regulators can employ one or more switches to control current through an inductor coupled to a load. Control of the current allows charge to be regulated to the load to maintain a desired output voltage when the supply voltage to the regulator is not equal to the desired operating voltage of the device. If the supply voltage to the regulator is less than the desired operating voltage, a boost controller can switch one or more of the switches to direct the current through the inductor to supply a higher voltage to the load of the regulator, thus, maintaining an operating voltage greater than the supply voltage. If the supply voltage is greater than the desired operating voltage, a buck controller can switch one or more of the switches to direct the current through the inductor to charge the load to a desired voltage just above an operating voltage, and in certain examples, can allow the load to discharge before charging the load again.

As the supply voltage approaches the desired operating voltage, the buck and boost controllers can share control of the switches to maintain a consistent or well-regulated desired output voltage. However, when the controllers share control of the switches, the regulator can introduce switching losses that can significantly decrease the charge life of the power supply.

The present inventor has recognized, among other things, apparatus and methods to provide an efficient regulated voltage from a power supply when the supply voltage is near the desired operating voltage.

FIG. 1 illustrates a regulator 100 according to one embodiment of the present subject matter. The regulator 100 includes a boost controller 101, a buck controller 102, and a plurality of switches (e.g., first, second, third, and fourth switches Q1, Q2, Q3, Q4, etc.) to control current through an inductor L1. Control of the inductor current can modulate an output voltage VOUT at an output 103 of the regulator 100 under a range of loads. In some examples, the regulator 100 is configured to couple to a load capacitor $C_{OUT}$ to assist in regulating the output voltage VOUT. In various examples, the regulator includes the load capacitor $C_{OUT}$.

In the example of FIG. 1, the boost controller 101 is coupled to one or more of the switches (e.g., Q3, Q4, etc.) and can control the current through the inductor L1 when the input voltage VIN is lower than a desired output voltage. The buck controller 102 is coupled to one or more of the switches (e.g., Q1, Q2, etc.) and can control current through the inductor L1 when the input voltage VIN is higher than a desired output voltage.

One principle of inductors is that current through an inductor resists change. In an example, the buck and boost controllers 101, 102 can use this principle to initiate and then redirect current flow through the inductor to control voltage at an output of the regulator. In certain examples, the regulator 100 can include a capacitor or can supply power to a capacitive load to enhance the regulation of the voltage output VOUT.

In an example, the buck controller 102 can toggle various switches to control current flow through the inductor L1 and regulate the output voltage VOUT. For example, in a charge cycle, the buck controller 102 can switch the first and third switches Q1, Q3 on to initiate or maintain a current through the inductor L1, and the input voltage can be used to charge the inductor L1 and, in various embodiments, the load capacitor $C_{OUT}$. At the end of the charge cycle, the first switch Q1 can be switched off and the second switch Q2 can be switched on, decreasing or discharging the current through the inductor L1. At some point during the discharge cycle of the buck controller 102, both the inductor L1 and the capacitor $C_{OUT}$ can supply current to the load until both devices need to be charged again. This scenario allows a higher input voltage to supply a lower desired load voltage. In certain examples, during the charge cycle of the buck controller, the output voltage can be charged to a value at or slightly higher than the desired output voltage, and the capacitance of the load can charge such that current can be supplied to the load without large changes to the output voltage. Additional output capacitance can be added to assist in regulating the voltage. Higher input voltages generally require shorter charge time.

The boost controller 101 can toggle various switches to provide a desired output voltage VOUT that is higher than the input voltage VIN. During the charge cycle of the boost controller, current through the inductor L1 can be increased by switching off the third switch Q3 and switching on switches the first and fourth switches Q1, Q4. At the end of the charge cycle, current from the inductor L1 is redirected by switching off the fourth switch Q4 and switching on the third switch Q3. Thus, during the charge cycle, the inductor L1 is charging and load current is supplied by the output capacitor $C_{OUT}$. During the discharge cycle, the inductor L1 discharges and supplies current to both the output capacitor $C_{OUT}$ and the load. As the inductor L1 discharges, the output voltage VOUT is the sum of the input voltage and the voltage across the inductor.

The present inventor has recognized that, among other things, many existing buck-boost regulators continue to switch when the input voltage is substantially equal to the desired output voltage. Although such control can provide tight regulation of the output voltage, substantial losses are associated with the switching by each controller. Further, many devices can operate just as or nearly as effectively over a range of supply voltages as they can when supplied with a tightly regulated supply voltage. In these cases, the switching operation of many existing buck-boost regulators when the input voltage is near the desired output voltage is wasteful of, in many cases, a limited supply of energy.

The regulator 100 of FIG. 1 includes a first voltage threshold REF1 for the boost controller 101 and a second voltage threshold REF2 for the buck controller 102. The first threshold voltage REF1 can be lower than the second threshold voltage REF2, such that when the output voltage VOUT is near the desired output voltage, the buck controller 102 and the boost controller 101 maintain a state of each of the switches Q1, Q2, Q3, Q4, such that there are substantially no losses due to switching. Consequently, the regulator 100 is more efficient and the limited supply providing the input voltage can last longer before replacement or recharging. The difference between the first threshold voltage REF1 and the second threshold voltage REF2 can be related to the regulation quality of the output voltage VOUT. Thus, a larger difference between the first threshold voltage REF1 and second threshold voltage REF2 can result in a larger variation in the output voltage.

In various embodiments, the regulator 100 can include a variable frequency controller (not shown). The variable frequency controller can be used to trigger each switch, for example, when the switches are used for pulse width modulation of inductor current. In some embodiments, the frequency of switching can be reduced as the output voltage VOUT approaches the dead band between the first threshold voltage REF1 and second threshold voltage REF2, thus, further reducing switching losses. In various embodiments, the regulator 100 can include a bypass switch 104 coupled between the input voltage terminal and the output voltage terminal. The bypass switch 104 can be closed when the input voltage is substantially equal to the supply voltage, thus reducing resistance losses associated with, for example, the first switch Q1, the inductor L1, and the third switch Q3. The bypass switch 104 can close when the output voltage OUT is between the first threshold voltage REF1 and second threshold voltage REF2, and is open when the output voltage VOUT is outside the dead band between the first threshold voltage REF 1 and the second threshold voltage REF2. In various embodiments, the buck and boost controllers use one or more of the switches Q1, Q2, Q3, Q4 to control the inductor current. It is understood that although FIG. 1 shows transistors for the various switches Q1, Q2, Q3, Q4 of the regulator 100, other types of switches including, but not limited to, other types of semiconductor switches are possible without departing from the scope of the present subject matter. For example, the second and third switches Q2, Q3 can be replaced by diodes.

Figure 2:
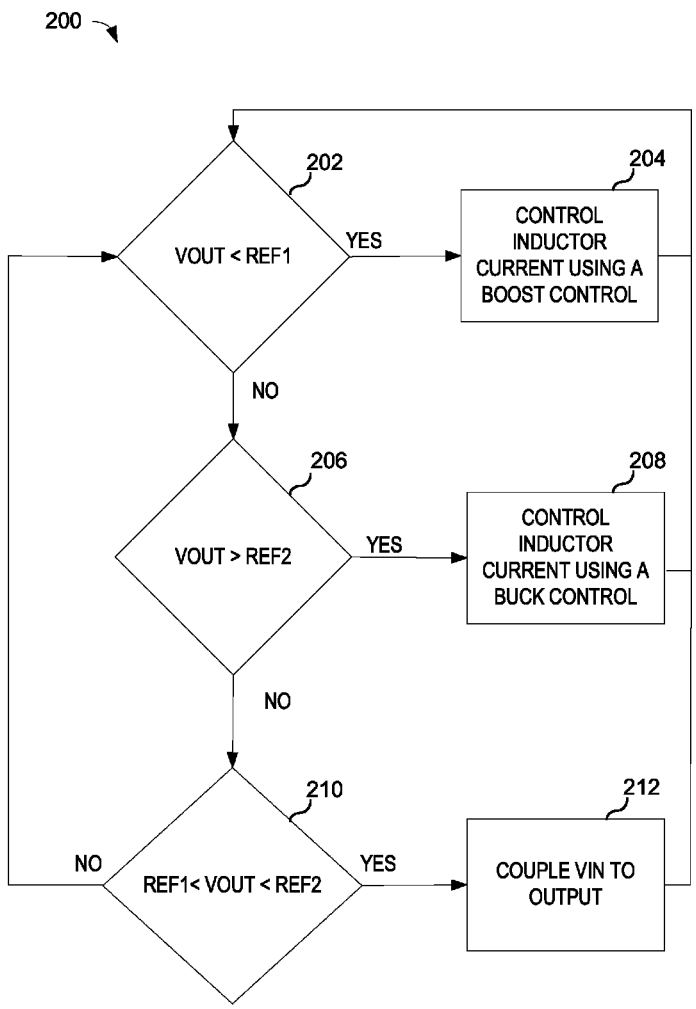
FIG. 2 illustrates generally a flowchart of a method according to one embodiment of the present subject matter.

FIG. 2 illustrates generally a flowchart of a method 200 of providing a desired output voltage according to one embodiment of the present subject matter. The method 200 includes, at 204, controlling inductor current using a boost controller when, at 202, the output voltage VOUT is less than a first threshold voltage REF1. The method 200 includes, at 208, controlling inductor current using a buck controller when, at 206, the output voltage VOUT is greater than a second voltage threshold REF2. The method 200 further includes, at 212, coupling the input voltage VIN to the output of the regulator when, at 210, the output voltage VOUT is greater than the first threshold voltage REF1 and less than the second threshold voltage REF2.

In various embodiments, the first threshold voltage REF1 can be set less than the second threshold voltage REF2 to create a dead band between the first and second threshold voltages REF1, REF2. When the value of the output voltage VOUT is in the dead band, the switches of the regulator can be maintained in a state that couples the input voltage VIN to the output of the regulator. Such a configuration can efficiently provide a desired output voltage and minimize switching losses due to buck and boost control of the inductor current when the output voltage VOUT is at or near the desired output voltage. Minimizing the switching when the output voltage VOUT is at or near the desired output voltage can also substantially eliminate switching noise often present with other buck-boost regulators.

In an example, if the desired output voltage of a regulator is about 3.35 volts and the electronics supplied by the regulator can operate with at least a ±1.5% fluctuation in the supplied voltage, the first threshold voltage REF1 can be set to about 3.3 volts and the second threshold voltage REF2 can be set to about 3.4 volts, such that the dead band is 0.1 volts about the desired output voltage. Where the electronics can tolerate larger fluctuations in output voltage of the buck-boost regulator, the dead band can be increased. An increased dead band can result in more efficient regulation and longer intervals between charging or replacing the power source. It understood that the above voltages are exemplary and that other desired output voltages or reference voltages that provide the dead band are possible without departing from the scope of the present subject matter.

Figure 3A:
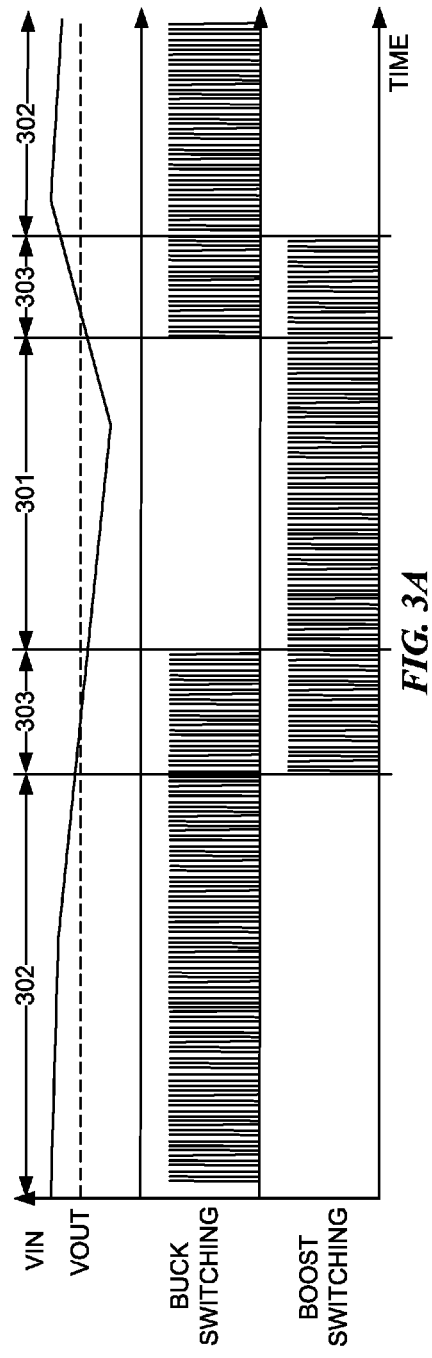
FIG. 3A illustrates generally VIN, VOUT and switching signals of a buck-boost regulator.
Figure 3B:
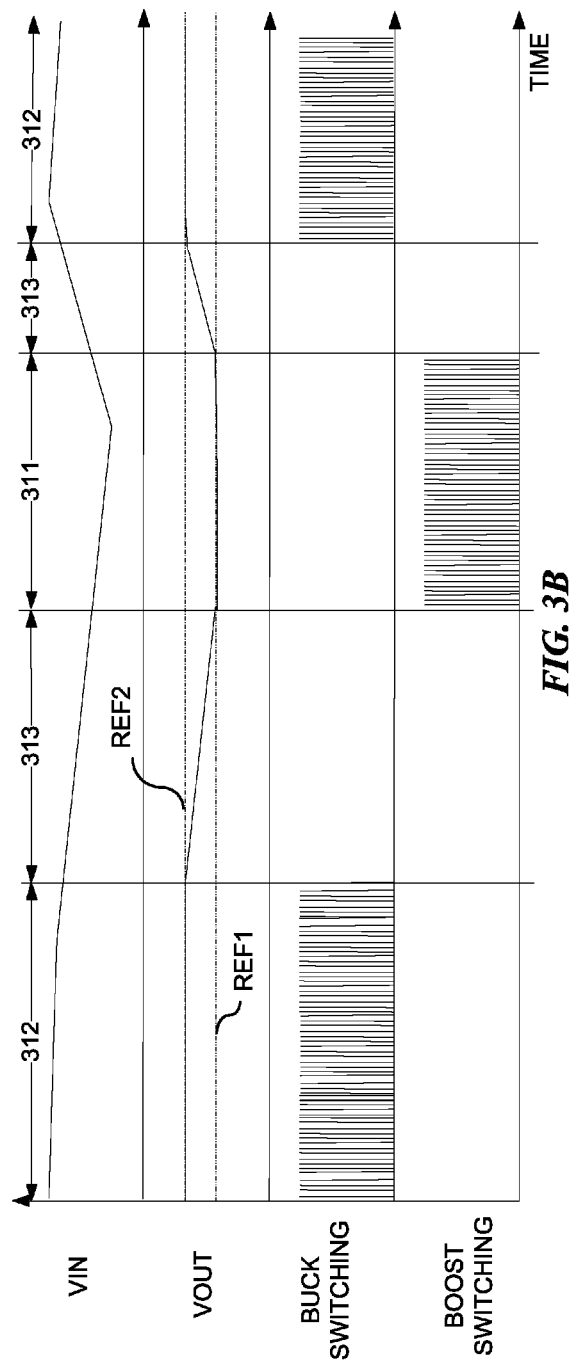
FIG. 3B illustrates generally VIN, VOUT and switching signals of a buck-boost regulator according to one embodiment of the present subject matter.

FIG. 3A illustrates generally an example of an input voltage VIN, an output voltage VOUT, and buck and boost switching signals of a typical buck-boost regulator. FIG. 3B illustrates generally an example of an input voltage VIN, an output voltage VOUT, and buck and boost switching signals of a buck-boost regulator according to one embodiment of the present subject matter.

In FIG. 3A, the boost controller triggers switching when the input voltage VIN is below the output voltage VOUT (e.g., at period 301) to control inductor current and maintain the desired output voltage. The buck controller triggers switching when the input voltage VIN is above the output voltage VOUT (e.g., at period 302) to control inductor current and maintain the output voltage VOUT. When the input voltage VIN is at or near the output voltage VOUT, both the buck and the boost controllers trigger switching to maintain the output voltage VOUT (e.g., at period 303).

In FIG. 3B, the boost controller triggers switching when the input voltage VIN is below a first threshold voltage REF1 (e.g., at period 311). In an example, the boost controller can control and redirect inductor current to provide an output voltage VOUT at or near the first threshold voltage REF1. In various embodiments, using the regulator 100 illustrated in FIG. 1, the boost controller 101 can toggle the third and fourth switches Q3, Q4, with the first switch Q1 being held on, when the input voltage VIN drops low enough to otherwise cause the output voltage VOUT to fall below the first threshold voltage REF1. The boost controller can compare the output voltage VOUT to the first threshold voltage REF1 to detect when the output voltage VOUT falls below the first threshold voltage REF1.

The buck controller triggers switching when the input voltage VIN is above a second threshold voltage REF2 (e.g., at period 312). In an example, the buck controller can control and redirect inductor current to provide an output voltage at or near the second threshold voltage REF2. In various embodiments, using the regulator 100 illustrated in FIG. 1, the buck controller 102 can toggle the first and second switches Q1, Q2, with the third switch Q3 being held on, when the input voltage VIN is high enough to cause the output voltage VOUT to rise above the second threshold voltage REF2. The buck controller can compare the output voltage VOUT to the second threshold voltage REF2 to detect when the output voltage VOUT is above the second threshold voltage REF2.

When the input voltage VIN is between the first threshold voltage REF1 and the second threshold voltage REF2 (e.g., at period 313), the buck controller and the boost controller can couple the input voltage VIN to the output voltage VOUT and maintain a state of the switches. When the input voltage VIN is high enough to maintain the output voltage VOUT above the first threshold voltage REF1, but too low to cause the output voltage VOUT to reach the second threshold voltage REF2 (e.g., at period 313), the input voltage VIN can be coupled to the output voltage VOUT. In various embodiments, the regulator 100 illustrated in FIG. 1 can turn on the first and third switches Q1, Q3, which couples the input voltage VIN to the output voltage VOUT. In this example, the switching losses illustrated in the example of FIG. 3B are substantially reduced compared to those illustrated in the example of FIG. 3A.

In various embodiments, conduction losses through the inductor and the associated buck and boost switches can be reduced further using one or more techniques. For example, the regulator 100 illustrated in FIG. 1 can use a bypass switch (e.g., a bypass switch 104) to bypass one or more other switches (e.g., the first, second, third, or fourth switches Q1, Q2, Q3, Q4) or inductors (e.g., the inductor L1). In an example, the bypass switch can more directly couple the input voltage VIN to the output voltage VOUT when the output voltage is in the dead band (e.g., at period 313) between the first threshold voltage REF1 and the second threshold voltage REF2. Reducing losses in the regulator can extend the life of the battery or other limited voltage supply of a device, such as a portable device including, but not limited to, cell phones, personal digital assistants (PDAs), portable media players, cameras, camcorders, or combinations thereof.

In an example, the output voltage VOUT and the input voltage VIN can drop together as current demand of the load increases, or rise together as current demand of the load decreases. In various examples, either of the input voltage VIN or the output voltage VOUT can be compared to one or more of the first or second threshold voltages REF1, REF2, and the regulator can control switching of the one or more switches using the results of the either comparison.

ADDITIONAL NOTES

The above detailed description includes references to the accompanying drawings, which form a part of the detailed description. The drawings show, by way of illustration, specific examples in which the invention can be practiced. These examples are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other examples can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed example. Thus, the following claims are hereby incorporated into the Detailed Description, with each claim standing on its own as a separate example. The scope of the invention should be determined with reference to the appended claims, along with the full scope of legal equivalents to which such claims are entitled.

What is claimed is:

1. An apparatus comprising:
    a regulator including an input configured to receive an input voltage and an output configured to provide an output voltage, the regulator including:
        a boost controller configured to compare the output voltage to a first threshold and to provide voltage to the output when the output voltage is below the first threshold voltage; and
        a buck controller configured to compare the output voltage to a second threshold and to provide voltage to the output when the output voltage is above the second threshold voltage; and
    wherein the regulator is configured to provide the input voltage at the output when the output voltage is between the first and second threshold voltages, wherein the first threshold voltage is below the second threshold voltage.

2. The apparatus of claim 1, wherein the boost controller is configured to provide voltage to the output when the output voltage is below the first threshold voltage;
    wherein the buck controller is configured to provide voltage to the output when the output voltage is above the second threshold voltage; and
    wherein the regulator is configured to provide the input voltage at the output when the output voltage is between the first threshold voltage and the second threshold voltage.

3. The apparatus of claim 1, wherein the regulator is configured to couple the input to the output when the output voltage is between the first and second threshold voltages.

4. The apparatus of claim 1, wherein the regulator includes a plurality of switches configured to be coupled to an inductor;
    wherein the boost controller is configured to control current through the inductor, using at least one of the plurality of switches, to provide voltage to the output higher than the input voltage when the output voltage is below the first threshold voltage;
    wherein the buck controller is configured to control current through the inductor, using at least one of the plurality of switches, to provide voltage to the output lower than the input voltage when the output voltage is above the second threshold voltage; and
    wherein the regulator is configured to maintain a state of each of the plurality of switches when the output voltage is between the first and second threshold voltages.

5. The apparatus of claim 4, wherein the plurality of switches includes a first switch configured to couple a voltage source to a first terminal of the inductor.

6. The apparatus of claim 5, wherein the regulator is configured to maintain the first switch in a conducting state when the output voltage is between the first and second threshold voltages.

7. The apparatus of claim 4, wherein the plurality of switches include a second switch configured to couple a ground to a first terminal of the inductor.

8. The apparatus of claim 7, wherein the regulator is configured to maintain the second switch in a non-conducting state when the output voltage is between the first and second threshold voltages.

9. The apparatus of claim 4, wherein the plurality of switches includes a third switch configured to couple a second terminal of the inductor to a load.

10. The apparatus of claim 9, wherein the regulator is configured to maintain the third switch in a conducting state when the output voltage is between the first and second threshold voltages.

11. The apparatus of claim 4, wherein the plurality of switches includes a fourth switch configured to couple the second terminal of inductor to ground.

12. The apparatus of claim 11, wherein the regulator is configured to maintain the fourth switch in a non-conducting state when the output voltage is between the first and second thresholds.

13. The apparatus of claim 4, including a bypass switch configured to couple the input to the output when the output voltage is between the first and second threshold voltages.

14. The apparatus of claim 1, wherein the apparatus includes an integrated circuit, the integrated circuit including the regulator.

15. The apparatus of claim 1, wherein the boost controller is configured to reduce a boost switching frequency as the output voltage approaches the first threshold from a voltage value lower than the first threshold.

16. The apparatus of claim 1, wherein the buck controller is configured to reduce a buck switching frequency as the output voltage approaches the second threshold from a voltage value higher than the second threshold.

17. The apparatus of claim 1, wherein at least one of the first or second thresholds is programmable.

18. A method comprising:
receiving an input voltage at an input of a regulator and providing an output voltage at an output of the regulator, the providing the output voltage including:
comparing the output voltage to a first threshold;
comparing the output voltage to a second threshold;
providing voltage to the output of the regulator using a boost controller when the output voltage is below the first threshold voltage; and
providing voltage to the output of the regulator using a buck controller when the output voltage is above the second threshold voltage; and
providing the input voltage at the output of the regulator when the output voltage is between the first and second threshold voltages, wherein the first threshold voltage is below the second threshold voltage.

19. The method of claim 18, wherein the providing the input voltage at the output of the regulator includes coupling the input to the output.

20. The method of claim 18, wherein the providing voltage to the output of the regulator using the boost controller includes controlling current through an inductor using at least one of a plurality of switches to provide an output voltage higher than the input voltage the output voltage is below the first threshold;
wherein the providing voltage to the output of the regulator using the buck controller includes controlling current through the inductor using at least one of a plurality of switches to provide an output voltage lower than the input voltage when the output voltage is above the second threshold; and
wherein the providing the input voltage at the output of the regulator includes maintaining a state of each of the plurality of switches when the output voltage is between the first and second threshold voltages.

21. The method of claim 20, wherein the regulator includes the plurality of switches;
wherein the plurality of switches includes:
a first switch coupled between a first terminal of the inductor and the input;
a second switch coupled between the first terminal of the inductor and ground;
a third switch coupled between a second terminal of the inductor and the output; and
a fourth switch coupled between the second terminal of the inductor and ground;
wherein the providing voltage to the output of the regulator using the boost controller includes switching the third switch and the fourth switch in a first sequence to provide an output voltage higher than the input voltage when the output voltage is below the first threshold; and
wherein the providing voltage to the output of the regulator using the buck controller includes switching the first switch and the second switch in a second sequence to provide an output voltage lower than the input voltage when the output voltage is above the second threshold.

22. The method of claim 21, wherein the maintaining the state of each of the plurality of switches includes maintaining the first and third switches in conducting states and maintaining the second and fourth switches in non-conducting states when the output voltage is between the first and second threshold voltages.

23. A system comprising:
an inductor having a first terminal and a second terminal;
a regulator including an input configured to receive an input voltage and an output configured to provide an output voltage, the regulator including:
a first switch coupled to the first terminal of the inductor and to the input of the regulator;
a second switch coupled to the first terminal of the inductor and to ground;
a third switch coupled to the second terminal of the inductor and to the output of the regulator;
a fourth switch coupled to the second terminal of the inductor and to ground;
a boost controller configured to compare the output voltage to a first threshold and to provide voltage to the output when the output voltage is below a first threshold voltage; and
a buck controller configured to compare the output voltage to a second threshold and to provide voltage to the output when the output voltage is above a second threshold voltage; and
wherein the regulator is configured to provide the input voltage at the output when the output voltage is between the first and second threshold voltages, wherein the first threshold voltage is below the second threshold voltage.

* * * * *